Patented Feb. 3, 1953

2,627,518

UNITED STATES PATENT OFFICE 2,627,518

1-(2-N-PIPERIDINOETHYLAMINO)-4-METHYLTHIAXANTHONES AND THEIR PREPARATION

Sydney Archer, Albany, N. Y., assignor to Sterling Drug Inc. New York, N. Y., a corporation of Delaware No Drawing. Application November 22, 1950, Serial No. 197,173

16 Claims. (Cl. 260—293.4)

1

This invention relates to 1-(2-N-piperidinoethylamino)-4-methylthiaxanthones and to their method of preparation. In particular it relates to such thiaxanthones having the structural formula

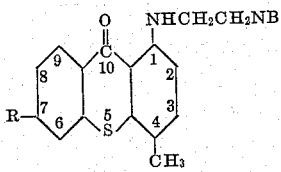

where R is hydrogen, a halo group, a lower alkyl radical or a lower alkoxy radical and NB is the N-piperidino radical or a lower alkylated N-piperidino radical. These compounds of my invention are useful as chemotherapeutic agents, for instance, as agents in treating schistosomiasis.

In the above formula R, when halo, means chloro, bromo, iodo and fluoro. R, when lower alkyl or lower alkoxy, has preferably 1-4 carbon atoms inclusive, including such radicals as methyl, ethyl, n-propyl, isopropyl, n-butyl, isobutyl and 2-butyl for lower alkyl; and methoxy, ethoxy, n-propoxy, isopropoxy, n-butoxy, isobutoxy and 2-butoxy for lower alkoxy. The N-piperidino radical, designated hereinabove as NB, comprehends the unsubstituted N-piperidino radical and lower alkylated N-piperidino radicals such as 2-methyl-N-piperidino, 2,6-dimethyl-N-piperidino, 3-ethyl-N-piperidino, 4-methyl-N-piperidino, and the like.

My compounds are prepared by heating, preferably in refluxing pyridine at atmospheric pressure, a 2-N-piperidinoethylamine having the formula, $H_2NCH_2CH_2NB$, with a 1-halo-4-methylthiaxanthone having the formula

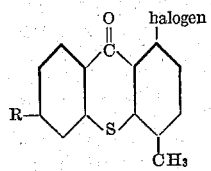

where halogen means chloro, bromo, iodo and fluoro, and where NB and R have the meanings designated hereinabove. The intermediate 1-halo-4-methyl-7-R-thiaxanthones where R is a halo group, a lower alkyl radical or a lower alkoxy radical are prepared by cyclizing a 2-(2-methyl-5-halophenylmercapto)-4-R-benzoic acid. These intermediate 2-(2-methyl-5-halophenylmercapto)-4-R-benzoic acids, which are prepared by heating a metal salt of a 2-halo-4-substituted-benzoic acid with a metal salt of a 2-methyl-5-halothiophenol in the presence of a copper cat-

2 alyst, are described and claimed in my copending application Serial Number 197,174, filed November 22, 1950.

The intermediate 1-chloro-4-methylthiaxanthone (where R is H) was obtained mixed with its 1-methyl-4-chloro isomer according to Ullmann and Glenck [Ber. 49, 2487 (1916)] by condensing para-chlorotoluene with thiosalicylic acid in sulfuric acid. I also prepared this mixture of isomeric chloro-methylthiaxanthones by substituting dithiosalicylic acid for thiosalicylic acid in the condensation with para-chlorotoluene, a specific adaptation of a general procedure first discovered by Davies and Smiles [J. Chem. Soc. 97, 1290 (1909)]. This mixture of isomeric thiaxanthones can be used satisfactorily in the condensation with a 2-N-piperidinoethylamine since only the 1-chloro-4-methyl isomer reacts with the diamine.

Illustrative of my invention are the preparations of 1-(2-N-piperidinoethylamino)-4-methyl-7-iodothiaxanthone hydrochloride by the reaction of 2-N-piperidinoethylamine with 1-chloro-4-methyl-7-iodothiaxanthone; 1-[2-(2-methyl-N-piperidino)ethylamino]-4-methyl-7-ethylthiaxanthone hydrobromide from 2-(2-methyl-N-piperidino)ethylamine and 1-bromo-4-methyl-7-ethylthiaxanthone; and 1-[2-(4-ethyl-N-piperidino)ethylamino]-4-methyl-7-isopropoxythiaxanthone hydroiodide from 2-(4-ethyl-N-piperidino)ethylamine and 1-iodo-4-methyl-7-isopropoxythiaxanthone. Reaction of 2-(2,6-dimethyl-N-piperidino)ethylamine with the above described mixture of 1-chloro-4-methylthiaxanthone and 1-methyl-4-chlorothiaxanthone results in the formation of 1-[2-(2,6-dimethyl-N-piperidino)ethylamino]-4-methylthiaxanthone in the form of its hydrochloride addition salt.

My 1-(2-N-piperidinoethylamino)-4-methylthiaxanthones are therapeutically active when administered orally whether employed as the free bases or as their salts with relatively non-toxic organic or inorganic acids, although in most cases the salt form is more convenient to employ. I found it convenient to isolate my compounds as the hydrohalides, especially the hydrochlorides, and as the methanesulfonates. However, other acid addition salts are within the scope of my invention, such salts including the phosphates, sulfates, citrates, ethanesulfonates, tartrates, succinates, acetates, benzoates, mandelates, oleates, and the like.

EXAMPLE 1

A. *1-chloro-4,7-dimethylthiaxanthone*

A mixture of 10 g. of 2-(2-methyl-5-chlorophenylmercapto)-4-methylbenzoic acid and 100 g. of concentrated sulfuric acid was heated with stirring on a steam bath for ninety minutes. The reaction mixture was cooled, poured into water and the resulting aqueous mixture filtered. The yellow solid was suspended in dilute ammonia and heated to boiling. After ten minutes the solid was filtered, washed with water and then with acetone and dried. There was thus obtained 8.5 g. of 1-chloro-4,7-dimethylthiaxanthone, M. P. 147.8–148.8° C. (cor.) when recrystallized from acetic acid-water.

Anal. Calcd. for $C_{15}H_{11}ClOS$: C, 65.56; H, 4.04. Found: C, 65.47; H, 4.35.

Other 1-halo-4-methyl-7-alkylthiaxanthones can be obtained according to the foregoing procedure by using other 2-(2-methyl-5-halophenylmercapto)-4-alkylbenzoic acids in place of 2-(2-methyl-5-chlorophenylmercapto)-4-methylbenzoic acid. Thus, using 2-(2-methyl-5-bromophenylmercapto)-4-ethylbenzoic acid, 2-(2-methyl-5-iodophenylmercapto)-4-isopropylbenzoic acid, 2-(2-methyl-5-chlorophenylmercapto)-4-n-butylbenzoic acid and 2-(2-methyl-5-chlorophenylmercapto)-4-isobutylbenzoic acid, there is obtained, respectively, 1-bromo-4-methyl-7-ethylthiaxanthone, 1-iodo-4-methyl-7-isopropylthiaxanthone, 1-chloro-4-methyl-7-n-butylthiaxanthone and 1-chloro-4-methyl-7-isobutylthiaxanthone.

B. 1-(2-N-piperidinoethylamino)-4,7-dimethylthiaxanthone hydrochloride

This compound can be prepared following the procedure given hereinafter for Example 2B, but using 1-chloro-4,7-dimethylthiaxanthone in place of 1,7-dichloro-4-methylthiaxanthone. The product thus obtained is 1-(2-N-piperidinoethylamino)-4,7-dimethylthiaxanthone hydrochloride.

1-[2-(2-methyl-N-piperidino)ethylamino]-4,7-dimethylthiaxanthone hydrochloride results when the foregoing procedure is followed using 2-(2-methyl-N-piperidino)ethylamine in place of 2-N-piperidinoethylamine.

Other 1-(2-N-piperidinoethylamino)-4-methyl-7-alkylthiaxanthones can be prepared following the directions given above, but using other 1-halo-4-methyl-7-alkylthiaxanthones in place of 1-chloro-4,7-dimethylthiaxanthone. Thus, using 1-bromo-4-methyl-7-ethylthiaxanthone, 1-iodo-4-methyl-7-isopropylthiaxanthone, 1-chloro-4-methyl-7-n-butylthiaxanthone and 1-chloro-4-methyl-7-isobutylthiaxanthone, there is obtained 1-(2-N-piperidinoethylamino)-4-methyl-7-ethylthiaxanthone hydrobromide, 1-(2-N-piperidinoethylamino)-4-methyl-7-isopropylthiaxanthone hydroiodide, 1-(2-N-piperidinoethylamino)-4-methyl-7-n-butylthiaxanthone hydrochloride and 1-(2-N-piperidinoethylamino)-4-methyl-7-isobutylthiaxanthone hydrochloride, respectively.

EXAMPLE 2

A. 1,7-dichloro-4-methylthiaxanthone

This preparation was carried out according to the procedure described hereinabove for Example 1A, but using 4.0 g. of 2-(2-methyl-5-chlorophenylmercapto)-4-chlorobenzoic acid and 40 g. of sulfuric acid. There was thus obtained 3.5 g. of 1,7-dichloro-4-methylthiaxanthone, M. P. 196–197° C. (cor.) when recrystallized from acetic acid.

Anal. Calcd. for $C_{14}H_8Cl_2OS$: C, 57.1; H, 2.71. Found: C, 57.5; H, 2.94.

Other 1,7-dihalo-4-methylthiaxanthones can be prepared according to the above procedure by substituting the appropriate 2-2(-methyl-5-halo-phenylmercapto)-4-halobenzoic acid for 2-(2-methyl-5-chlorophenylmercapto)-4-chlorobenzoic acid. Thus, using 2-(2-methyl-5-bromophenylmercapto)-4-bromobenzoic acid, 2-(2-methyl-5-iodophenylmercapto)-4-iodobenzoic acid, 2-(2-methyl-5-chlorophenylmercapto)-4-bromobenzoic acid and 2-(2-methyl-5-chlorophenylmercapto)-4-iodobenzoic acid, there is obtained 1,7-dibromo-4-methylthiaxanthone, 1,7-diiodo-4-methylthiaxanthone, 1-chloro-4-methyl-7-bromothiaxanthone and 1-chloro-4-methyl-7-iodothiaxanthone, respectively.

B. 1-(2-N-piperidinoethylamino)-4-methyl-7-chlorothiaxanthone methanesulfonate A mixture of 10 g. of 1,7-dichloro-4-methylthiaxanthone, 10 g. of 2-N-piperidinoethylamine and 10 g. of pyridine was refluxed for twenty hours. The mixture was dissolved in 50 ml. of ethanol and cooled. The solid was filtered, washed in ethanol and suspended in 50 ml. of ethanol. To this alcohol solution was added 2 ml. of methanesulfonic acid. The resulting solution was boiled and filtered, and the filtrate was then treated with dry ether until turbid. On cooling, 10.3 g. of the desired salt separated. After recrystallization from ethanol there was obtained 8.5 g. of the purified product, 1-(2-N-piperidinoethylamino)-4-methyl-7-chlorothiaxanthone methanesulfonate, M. P. 185.2–186.2° C. (cor.)

1-[2-(2,6-dimethyl-N-piperidino)ethylamino]-4-methyl-7-chlorothiaxanthone hydrochloride is formed when the above procedure is followed using 2-(2,6-dimethyl-N-piperidino)ethylamine in place of 2-N-piperidinoethylamine.

Other 1-(2-N-piperidinoethylamino)-4-methyl-7-halothiaxanthones can be prepared according to the procedure given above, but using other 1,7-dihalo-4-methylthiaxanthones in place of 1,7-dichloro-4-methylthiaxanthone. Thus, using 1,7-dibromo-4-methylthiaxanthone or 1-chloro-4-methyl-7-bromothiaxanthone, there is obtained 1-(2-N-piperidinoethylamino)-4-methyl-7-bromothiaxanthone in the form of its hydrobromide or hydrochloride addition salt, respectively. Using 1,7-diiodo-4-methylthiaxanthone or 1-chloro-4-methyl-7-iodothiaxanthone, there is obtained 1-(2-N-piperidinoethylamino)-4-methyl-7-iodothiaxanthone in the form of its hydroiodide or hydrochloride addition salt, respectively.

EXAMPLE 3

A. 1-chloro-4-methyl-7-methoxythiaxanthone

The preparation of this compound was carried out following the procedure described hereinabove in Example 1A, but using 16.0 g. of 2-(2-methyl-5-chlorophenylmercapto)-4-methoxybenzoic acid and 160 g. of sulfuric acid, and a heating period of thirty minutes. There was obtained 9.7 g. of 1-chloro-4-methyl-7-methoxythiaxanthone, M. P. 188.0–190.1° C. (cor.) when recrystallized from acetic acid.

Anal. Calcd. for $C_{15}H_{11}ClO_2S$: S, 11.03. Found: S, 11.08.

Other 1-halo-4-methyl-7-alkoxythiaxanthones can be prepared according to the above procedure, but substituting the appropriate 2 - (2 - methyl - 5 - halo - phenylmercapto) - 4 - alkoxybenzoic acid for 2 - (2 - methyl - 5 - chlorophenylmercapto) - 4 - methoxybenzoic acid. Thus, using 2 - (2 - methyl - 5 - bromophenylmercapto) - 4 - ethoxybenzoic acid, 2 - (2 - methyl - 5 - iodophenylmercapto) - 4 - n - propoxybenzoic acid, 2 - (2 - methyl - 5 - chlorophenylmercapto) - 4 - isobutoxybenzoic acid and 2 - (2 - methyl - 5 - chlorophenylmercapto) - 4 - n - butoxybenzoic acid, there is obtained 1 - bromo - 4 - methyl - 7 - ethoxythiaxanthone, 1 - iodo - 4 - methyl - 7 - n - propoxythiaxanthone, 1 - chloro - 4 - methyl - 7 - isobutoxythiaxanthone and 1 - chloro - 4 - methyl - 7 - n - butoxythiaxanthone, respectively.

B. *1 - (2 - N - piperidinoethylamino) - 4 - methyl - 7 - methoxythiaxanthone hydrochloride*

This compound can be prepared following the procedure given hereinabove for Example 2B, but using 1 - chloro - 4 - methyl - 7 - methoxythiaxanthone in place of 1,7 - dichloro - 4 - methylthiaxanthone. The product thus obtained is 1 - (2 - N - piperidinoethylamino) - 4 - methyl - 7 - methoxythiaxanthone hydrochloride.

1 - [2 - (3 - ethyl - N - piperidino) ethylamino] - 4 - methyl - 7 - methoxythiaxanthone hydrochloride is formed when the foregoing procedure is followed substituting 2 - (3 - ethyl - N - piperidino)ethylamine for 2 - N - piperidinoethylamine.

Other 1 - (2 - N - piperidinoethylamino) - 4 - methyl - 7 - alkoxythiaxanthones can be prepared according to the procedure given above, but using other 1 - halo - 4 - methyl - 7 - alkoxythiaxanthones in place of 1 - chloro - 4 - methyl - 7 - methoxythiaxanthone. Thus, using 1 - bromo - 4 - methyl - 7 - ethoxythiaxanthone, 1 - iodo - 4 - methyl - 7 - n - propoxythiaxanthone, 1 - chloro - 4 - methyl - 7 - isobutoxythiaxanthone, 1 - chloro - 4 - methyl - 7 - n - butoxythiaxanthone, there is obtained 1 - (2 - N - piperidinoethylamino) - 4 - methyl - 7 - ethoxythiaxanthone hydrobromide, 1 - (2 - N - piperidinoethylamino) - 4 - methyl - 7 - n - propoxythiaxanthone hydroiodide, 1 - (2 - N - piperidinoethylamino) - 4 - methyl - 7 - isobutoxythiaxanthone hydrochloride and 1 - (2 - N - piperidinoethylamino) - 4 - methyl - 7 - n - butoxythiaxanthone hydrochloride, respectively.

EXAMPLE 4

A. *1-chloro-4-methylthiaxanthone*

The following preparation yields a mixture of the desired 1-chloro-4-methylthiaxanthone and its isomer, 1-methyl-4-chlorothiaxanthone, said mixture being satisfactory for use in the condensation reaction described below in Example 4B.

A mixture of 150 ml. of p-chlorotoluene and 1500 ml. of sulfuric acid was stirred vigorously at 25–30° C. as 60 g. of pure thiosalicylic acid was added. The mixture turned dark red, sulfur dioxide was evolved and the temperature rose about ten to fifteen degrees. Stirring was continued for about sixteen hours at room temperature and then the mixture was held at 60° C. for two hours. The solution was poured into an ice-water mixture and filtered. The yellow solid was suspended in dilute ammonia and steam was passed into the suspension for thirty minutes to remove any unreacted p-chlorotoluene. Then the solid was collected on a filter and washed successively with water, alcohol and acetone. On drying there was obtained 83 g. (81%) of the mixture of 1-chloro-4-methylthiaxanthone and 1-methyl-4-chlorothiaxanthone, said mixture being suitable for use in the condensation with the diamine. It melted at 142–145° C. (uncor.). Upon crystallization from acetic acid the melting point was raised slightly to 145–147° C. The loss on crystallization was about 20%.

In another experiment 159 g. of crude dithiosalicylic acid was condensed with 750 ml. of p-chlorotoluene in the presence of 1250 ml. of sulfuric acid. The temperature rise upon the addition of the dithio acid was about five degrees. At the end of the reaction the mixture was poured into ice-water and the suspension steam-distilled to remove excess p-chlorotoluene. The solid was collected and treated as above. There was obtained 175 g. (65%) of the mixture of 1-chloro-4-methylthiaxanthone and 1-methyl-4-chlorothiaxanthone, M. P. 138–142° C.

B. *1-(2-N-piperidinoethylamino) - 4 - methylthiaxanthone hydrochloride*

A mixture of 30 g. of a mixture of 1-chloro-4-methylthiaxanthone and its isomeric 1-methyl-4-chlorothiaxanthone, 15 g. of pyridine and 15 g. of 2-N-piperidinoethylamine was refluxed for eighteen hours, cooled and made basic with 50% aqueous potassium hydroxide solution. After steam distillation of the alkaline mixture, the residue was poured into water, the water was carefully decanted, and the gummy solid was taken up in 100 ml. of hot acetic acid. To the resulting red solution, 500 ml. of water was added, and the mixture then filtered. The filtrate was cooled and made basic. The solid was collected and dissolved in chloroform. The chloroform solution was taken to dryness and the residue was taken up in 100 ml. of absolute alcohol. The alcohol solution was then treated with ethanolic hydrogen chloride. The product deposited on cooling; it was filtered and dried. This product, 1-(2-piperidinoethylamino) - 4 - methylthiaxanthone hydrochloride, weighed 23 g. after two recrystallizations from ethanol and melted at 260.7–262.3° C. (cor.).

Anal. Calcd. for $C_{21}H_{24}N_2OS \cdot HCl$: N, 7.20; S, 8.24. Found: N, 7.14; S, 7.95.

I claim:
1. A thiaxanthone having the formula

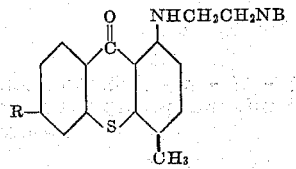

where R is selected from the group consisting of hydrogen, halo groups, lower alkyl radicals and lower alkoxy radicals and NB is selected from the group consisting of N-piperidino radicals and lower alkylated N-piperidino radicals.

2. A thiaxanthone having the formula

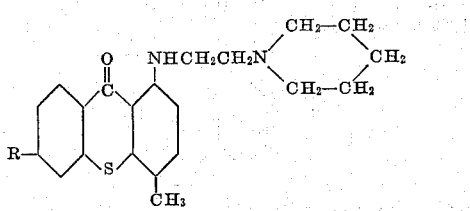

where R is a halo group.

3. A thiaxanthone having the formula

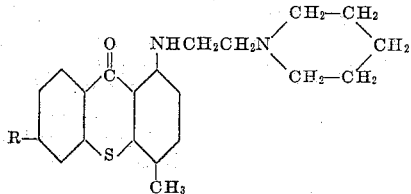

where R is a lower alkyl radical.

4. A thiaxanthone having the formula

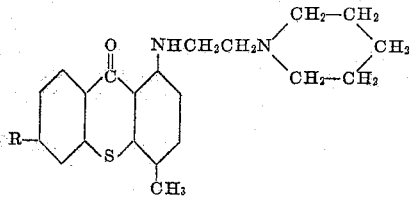

where R is a lower alkoxy radical.

5. 1 - (2 - N - piperidinoethylamino) - 4 - methyl-7-chlorothiaxanthone having the formula

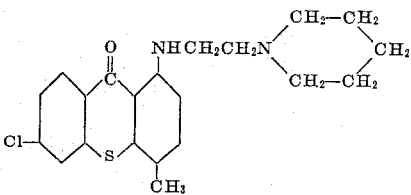

6. 1 - (2 - N - piperidinoethylamino) - 4,7 - dimethylthiaxanthone having the formula

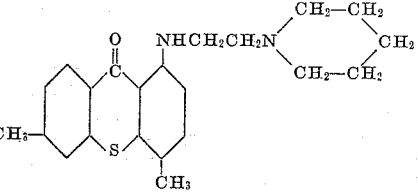

7. 1 - (2 - N - piperidinoethylamino) - 4 - methyl-7-methoxythiaxanthone having the formula

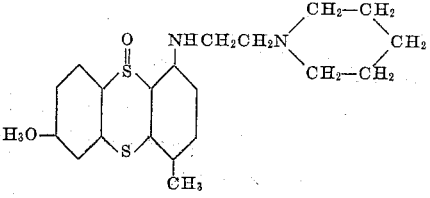

8. 1 - (2 - N - piperidinoethylamino) - 4 - methylthiaxanthone having the formula

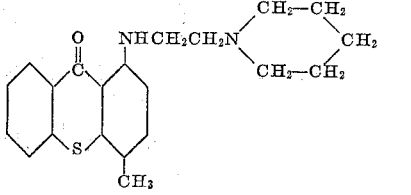

9. The process of preparing a thiaxanthone having the formula

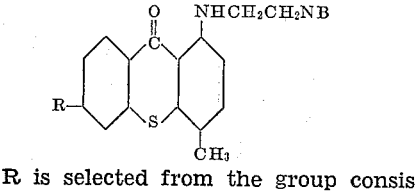

where R is selected from the group consisting of hydrogen, halo groups, lower alkyl radicals and lower alkoxy radicals and NB is selected from the group consisting of N-piperidino radicals and lower alkylated N-piperidino radicals, which comprises heating a 1-halo-4-methyl-7-R-thiaxanthone with a 2-N-piperidinoethylamine having the formula, H₂NCH₂CH₂NB, where R and NB have the meanings designated hereinabove.

10. The process of preparing a thiaxanthone having the formula

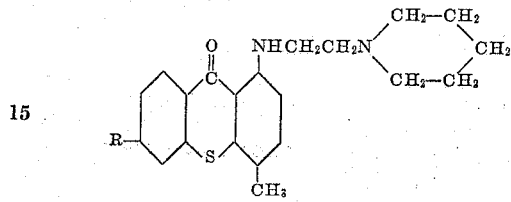

where R is a halo group, which comprises heating a 1,7-dihalo-4-methylthiaxanthone with 2-N-piperidinoethylamine.

11. The process of preparing a thiaxanthone having the formula

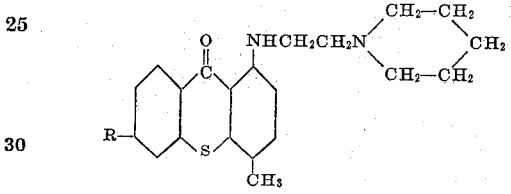

where R is a lower alkyl radical, which comprises heating a 1-halo-4-methyl-7-(lower alkyl)thiaxanthone with 2 - N - piperidinoethylamine.

12. The process of preparing a thiaxanthone having the formula

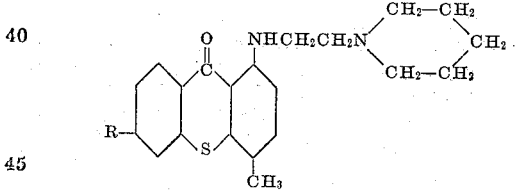

where R is a lower alkoxy radical, which comprises heating a 1-halo-4-methyl-7-(lower alkoxy)thiaxanthone with 2 - N - piperidinoethylamine.

13. The process of preparing 1-(2-N-piperidinoethylamino) - 4 - methyl - 7 - chlorothiaxanthone having the formula

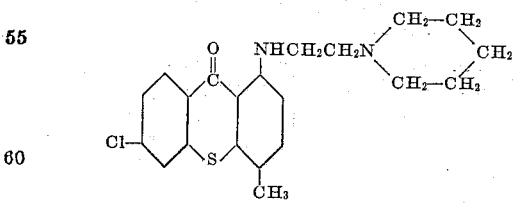

which comprises heating 1,7-dichloro-4-methylthiaxanthone with 2-N-piperidinoethylamine.

14. The process of preparing 1-(2-N-piperidinoethylamino) - 4,7 - dimethylthiaxanthone having the formula

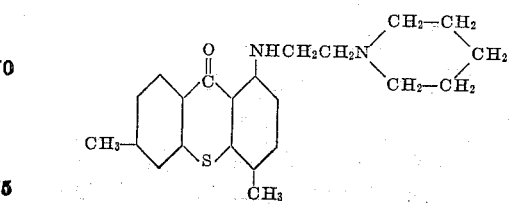

which comprises heating 1-chloro-4,7-dimethylthiaxanthone with 2-N-piperidinoethylamine.

15. The process of preparing 1-(2-N-piperidinoethylamino - 4 - methyl - 7 - methoxythiaxanthone having the formula

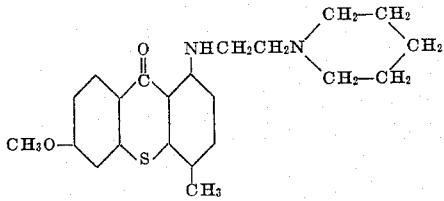

which comprises heating 1-chloro-4-methyl-7-methoxythiaxanthone with 2-N-piperidinoethylamine.

16. The process of preparing 1-(2-N-piperidinoethylamino)-4-methylthiaxanthone having the formula

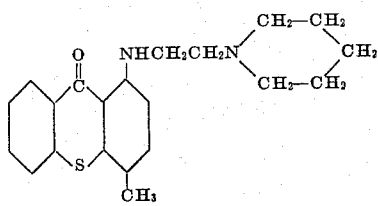

which comprises heating 1-chloro-4-methylthiaxanthone with 2-N-piperidinoethylamine.

SYDNEY ARCHER.

REFERENCES CITED

The following references are of record in the file of this patent:

UNITED STATES PATENTS

| Number | Name | Date |
| --- | --- | --- |
| 1,760,781 | Schulemann et al. | May 27, 1930 |
| 2,483,434 | Rieoeschl | Oct. 4, 1949 |

OTHER REFERENCES

Mauss: Fiat Review of German Science, Chemotherapy, Office of Mil. Gov't for Germany, 1948, pp. 283–288. (Q111 F5, No. 18.)